US012555397B2

(12) United States Patent
Jeong et al.

(10) Patent No.: US 12,555,397 B2
(45) Date of Patent: Feb. 17, 2026

(54) METHOD AND APPARATUS FOR DECHIPERING OBFUSCATED TEXT FOR CYBER SECURITY

(71) Applicants: SAMSUNG SDS CO., LTD., Seoul (KR); KOREA UNIVERSITY RESEARCH AND BUSINESS FOUNDATION, Seoul (KR)

(72) Inventors: Min Woo Jeong, Seoul (KR); Jeong Do Yoo, Seoul (KR); Seung Hyun Shin, Seoul (KR); Huy Kang Kim, Seoul (KR)

(73) Assignees: SAMSUNG SDS CO., LTD., Seoul (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 328 days.

(21) Appl. No.: 18/198,562

(22) Filed: May 17, 2023

(65) Prior Publication Data
US 2023/0377358 A1 Nov. 23, 2023

(30) Foreign Application Priority Data
May 17, 2022 (KR) .................. 10-2022-0060306

(51) Int. Cl.
*G06V 30/196* (2022.01)
*G06V 20/62* (2022.01)
*G06V 30/19* (2022.01)

(52) U.S. Cl.
CPC ........ *G06V 30/19093* (2022.01); *G06V 20/63* (2022.01)

(58) Field of Classification Search
CPC ................. G06V 30/00–43; G06V 20/62–635
See application file for complete search history.

(56) References Cited

U.S. PATENT DOCUMENTS

| 11,227,009 B1* | 1/2022 | Anubhai ................. G06F 18/23 |
| 11,463,455 B1* | 10/2022 | Huang .................... G06V 30/12 |
| 2010/0106677 A1* | 4/2010 | Yu ......................... H04L 51/212 |
| | | 709/206 |
| 2018/0041530 A1* | 2/2018 | Tang .................... H04L 63/1425 |
| 2019/0019021 A1* | 1/2019 | Hassanzadeh .......... G06T 15/20 |
| 2020/0065599 A1* | 2/2020 | Sosa-Trustham .... G06V 30/224 |
| 2020/0250459 A1* | 8/2020 | Sarshogh .......... G06V 30/18057 |
| 2021/0166028 A1* | 6/2021 | Ramenahalli Govindaraju .......... |
| | | G06V 20/52 |

(Continued)

FOREIGN PATENT DOCUMENTS

| CN | 107622267 B | 7/2020 |
| CN | 113762241 A | 12/2021 |

(Continued)

*Primary Examiner* — Sean T Motsinger
(74) *Attorney, Agent, or Firm* — Sughrue Mion, PLLC

(57) ABSTRACT

Provided is a method for deciphering obfuscated text for cyber security and an apparatus for the same. The method according to some embodiments includes: converting text including a target character string into an image; recognizing a character string in the image using a text recognition model; and determining that the target character string is an obfuscated character string, based on a similarity between the target character string and the recognized character string being equal to or less than a first reference value.

16 Claims, 13 Drawing Sheets

(56) References Cited

U.S. PATENT DOCUMENTS

| | | | | |
|---|---|---|---|---|
| 2022/0138088 A1* | 5/2022 | Shang | ................. | G06F 11/3684 |
| | | | | 717/124 |
| 2022/0343644 A1* | 10/2022 | Takahashi | ............ | G06V 10/987 |
| 2022/0343664 A1* | 10/2022 | Ito | ......................... | G06F 16/166 |
| 2022/0405524 A1* | 12/2022 | Yuan | .................... | G06N 3/0442 |
| 2023/0377358 A1* | 11/2023 | Jeong | .............. | G06V 30/19093 |
| 2024/0346840 A1* | 10/2024 | Brown | ................. | G06F 21/561 |

FOREIGN PATENT DOCUMENTS

| | | |
|---|---|---|
| CN | 113888505 A | 1/2022 |
| CN | 113903023 A | 1/2022 |
| JP | 4783899 B2 | 9/2011 |
| KR | 10-1777601 B1 | 9/2017 |
| KR | 10-2019-0083438 A | 7/2019 |
| KR | 10-2026280 B1 | 11/2019 |

* cited by examiner

90a

```
"name": "LEET",
"category": "misc",
"alias":[
        "id_0", "id_1"
],
"hit": 94,
"description": "This word means the LEET word.",
"reference": "www.leetword.com"
```

91a — "hit": 94,

```
"name": "|337",
"id": "id_1",
"meaning": "LEET",
"image": "image_1.png",
"source":{
        "file_name": "document_1.pdf",
        "page": 5,
        "line": 16
},
"hit": 3,
"timestamp": "2022-02-04 09:43:27"
```

91b → "hit": 3,

90c

```
"name": "1337",
"id": "id_0",
"meaning": "LEET",
"image": "image_0.png",
"source":{
        "file_name": "document_0.pdf",
        "page": 23,
        "line": 3
},
"hit": 91,
"timestamp": "2021-12-11 16:11:52"
```

91c → "hit": 91,

FIG. 12

METHOD AND APPARATUS FOR DECHIPERING OBFUSCATED TEXT FOR CYBER SECURITY

CROSS-REFERENCE TO RELATED APPLICATION

This application claims the benefit of Korean Patent Application No. 10-2022-0060306, filed on May 17, 2022, in the Korean Intellectual Property Office, the disclosure of which is incorporated herein by reference in its entirety.

BACKGROUND

1. Field

The present disclosure relates to a method and apparatus for deciphering obfuscated text. More specifically, it relates to a method and apparatus for determining whether texts related to cyber security are obfuscated and deciphering the obfuscated texts.

2. Description of the Related Art

In unstructured documents related to cyber security, obfuscated text (coded text) written by converting alphabets, Korean characters, or Chinese characters into other symbols appears quite often. A representative example of an obfuscation method is Leet.

Leet is a method of writing alphabets in a computer document by replacing them with other symbols. Leet is mainly used on the Internet, and examples include transcribing 'A' as '@' or 'aye' and 'B' as '!3' or 'P>.'

In the case of Leet words, as in the previous example, there are various ways to replace one alphabet, so one-to-one correspondence is impossible. Accordingly, it was difficult to analyze the text in a general way and have the computer decipher it. In addition, there was a problem that model-based automated natural language processing could not be accurately performed because an unstructured document containing Leet words is not accurately embedded.

Therefore, there is a need for a method capable of accurately recognizing and deciphering obfuscated text such as Leet words in unstructured documents related to cyber security.

SUMMARY

A technical problem to be solved by the present disclosure is to provide a method and apparatus for accurately deciphering obfuscated text.

Another technical problem to be solved by the present disclosure is to provide a method and apparatus for accurately determining whether given text is obfuscated.

Another technical problem to be solved by the present disclosure is to provide a database used to decipher obfuscated text.

Another technical problem to be solved by the present disclosure is to provide a method and apparatus for accurately performing natural language processing on an unstructured document including obfuscated text.

The technical problems of the present disclosure are not limited to the above-mentioned technical problems, and other technical problems not mentioned will be clearly understood by those skilled in the art from the description below.

According to an aspect of an example embodiment, there is provided a method for deciphering obfuscated test, the method being performed by at least one processor and including: converting text including a target character string into an image; recognizing a character string in the image using a text recognition model; and determining that the target character string is an obfuscated character string, based on a similarity between the target character string and the recognized character string being equal to or less than a first reference value.

The method may further include determining that the target character string is not the obfuscated character string based on the similarity exceeding the first reference value.

The text recognition model may be trained using a text image set, and the text image set may include a text image generated through at least one of color jittering, rotation, perspective transform, or blurring.

The method may further include: deciphering the target character string based on a determination that the target character string is the obfuscated character string. The deciphering the target character string may include: obtaining one or more candidate character strings by searching a database using the recognized character string, wherein character strings and a list of obfuscated character strings corresponding to the character strings are stored in the database; and obtaining a result of the deciphering the target character string based on a similarity between the recognized character string and the one or more candidate character strings.

The obtaining the result of the deciphering may include: determining that the target character string is a new obfuscated character string based on a similarity between the recognized character string and the one or more candidate character strings being equal to or less than a second reference value.

The obtaining the result of the deciphering may include: determining, among the one or more candidate character strings, a candidate character string whose similarity with the recognized character string exceeds a second reference value as the result of the deciphering the target character string.

The obtaining the result of the deciphering may include: configuring a character string search tree using the one or more candidate character strings; and calculating a similarity between the recognized character string and the one or more candidate character strings, by searching the character string search tree using the recognized character string.

A hit count indicating a number of times the character string is obtained as a candidate character string of a specific obfuscated character string or indicating a number of times the character string is obtained as the result of the deciphering may be further stored in the database, and the obtained one or more candidate character strings may include a character string having a hit count equal to or greater than a second reference value.

An ID of the character string, an ID and a first storage time of an obfuscated character string included in the list of obfuscated character strings, and a hit count indicating a number of times the character string is obtained as a candidate character string of a specific obfuscated character string or indicating a number of times the character string is obtained as the result of the deciphering may be further stored in the database.

The method may further include storing the target character string in the database based on a determination that the target character string is the new obfuscated character string.

The text recognition model may be a Scene Text Recognition (STR) model.

The obfuscated character string may be a character string including Leet words.

According to an aspect of an example embodiment, there is provided an apparatus for deciphering obfuscated test, the apparatus including: at least one processor; and at least one memory configured to store computer program executable by the at least one processor, wherein the computer program, when executed by the at least one processor, causes the at least one processor to perform: converting text including a target character string into an image; recognizing a character string in the image using a text recognition model; and determining that the target character string is an obfuscated character string based on a similarity between the target character string and the recognized character string being equal to or less than a first reference value.

The computer program may further cause the at least one processor to perform: deciphering the target character string through a database or determining whether the target character string is new obfuscated text based on a determination that the target character string is the obfuscated character string, wherein character strings and a list of obfuscated character strings corresponding to the character strings are stored in the database; and storing the target character string in the database based on a determination that the target character string is a new obfuscated character string.

The computer program may further cause the at least one processor to perform: determining that the target character string is not the obfuscated character string based on the similarity exceeding the first reference value.

An ID of the character string and an ID of an obfuscated character string included in the list of obfuscated character strings may be further stored in the database.

According to an aspect of an example embodiment, there is provided a non-transitory computer-readable recording medium storing computer program, the computer program being executable by at least one processor to cause the at least one processor to perform: converting text including a target character string into an image; recognizing a character string in the image using a text recognition model; and determining that the target character string is an obfuscated character string based on a similarity between the target character string and the recognized character string being equal to or less than a first reference value.

The computer program may further cause the at least one processor to perform: determining that the target character string is not the obfuscated character string based on the similarity exceeding the first reference value.

The computer program may further cause the at least one processor to perform: deciphering the target character string based on a determination that the target character string is the obfuscated character string, and the deciphering the target character string may include: obtaining one or more candidate character strings by searching a database using the recognized character string, wherein character strings and a list of obfuscated character strings corresponding to the character strings are stored in the database; and obtaining a result of deciphering the target character string based on a similarity between the recognized character string and the one or more candidate character strings.

An ID of the character string, an ID and a first storage time of an obfuscated character string included in the list of obfuscated character strings, and a hit count indicating a number of times the character string is obtained as a candidate character string of a specific obfuscated character string or indicating a number of times the character string is obtained as the result of the deciphering may be further stored in the database.

BRIEF DESCRIPTION OF THE DRAWINGS

These and/or other aspects will become apparent and more readily appreciated from the following description of the embodiments, taken in conjunction with the accompanying drawings in which:

FIGS. 11 and 12 are diagrams for describing exemplary methods of character strings stored in a database of the present disclosure.

DETAILED DESCRIPTION

Figure 1:
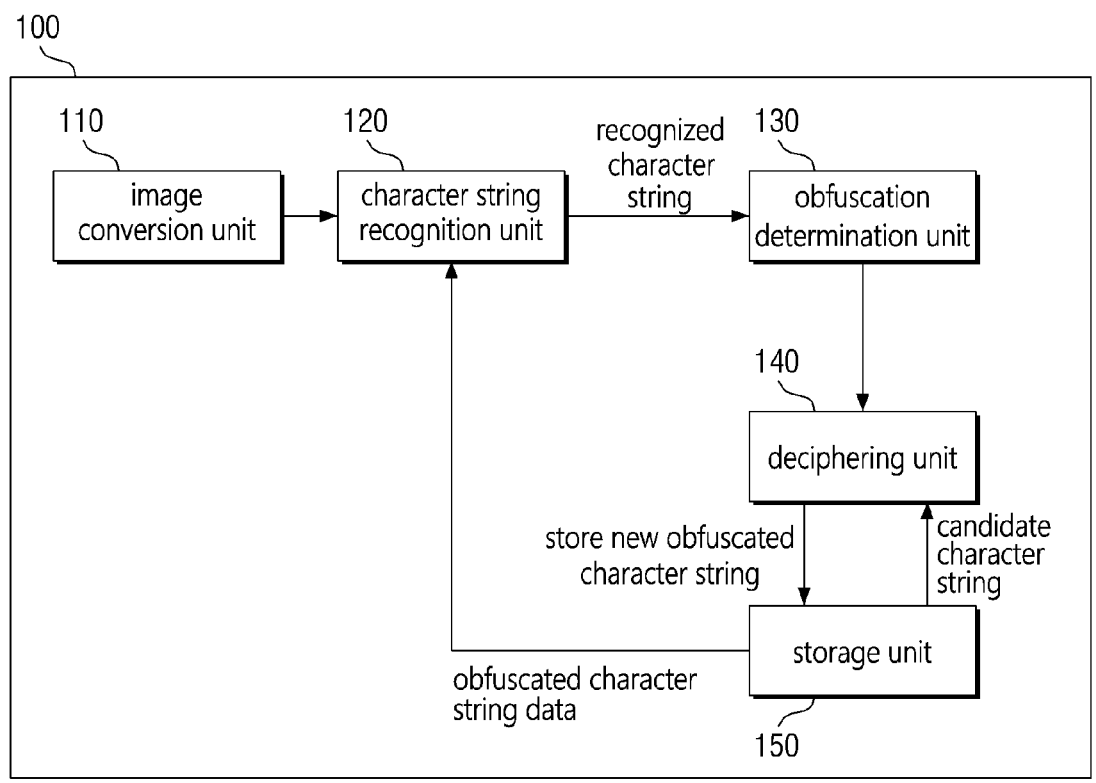
FIG. 1 is a block diagram of an apparatus for deciphering obfuscated text according to an embodiment of the present disclosure.

Hereinafter, example embodiments of the present disclosure will be described in detail with reference to the accompanying drawings. Advantages and features of the present disclosure, and methods of achieving them will become clear with reference to the detailed description of the following embodiments taken in conjunction with the accompanying drawings. However, the technical idea of the present disclosure is not limited to the following embodiments and may be implemented in various different forms. Only the following embodiments are provided to complete the technical idea of the present disclosure, and fully inform those skilled in the art of the technical field to which the present disclosure belongs the scope of the present disclosure, and the technical spirit of the present disclosure is defined by the scope of the claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings:

FIG. 1 is a block diagram of an apparatus 100 for deciphering obfuscated text according to an embodiment of the present disclosure.

Referring to FIG. 1, an apparatus 100 for deciphering obfuscated text according to the present embodiment may include an image conversion unit 110, a character string recognition unit 120, and an obfuscation determination unit 130. The obfuscated text deciphering system according to this embodiment may further include a deciphering unit 140 or a storage unit 150.

The image conversion unit 110 may convert input text including a target character string into an image. Here, the target character string is a character string subject to determination of obfuscation, and may be an obfuscated character string or a non-obfuscated general character string. For example, the target character string may be a character string obfuscated by replacing an alphabet with another visually (or morphologically) similar symbol, such as Leet words. As another example, the target character string may be a character string obfuscated by replacing Koran characters or Chinese characters with other visually (or morphologically) similar symbols. Hereinafter, for convenience of description, the term obfuscated character string is used interchangeably with the term obfuscation character string.

Here, the input text may be, for example, a document typed and printed through an electronic device such as a computer, a document written by hand, or an Internet document. In addition, the image does not necessarily have to have the form of a document, and may include all images of various formats that may be processed by an electronic device such as a computer.

According to an embodiment of the present disclosure, the image conversion unit 110 may convert input text into a plurality of images according to the length of the input text. Alternatively, the image conversion unit 110 may convert input text into one image and divide the converted image into a plurality of partial images.

According to an embodiment of the present disclosure, the image conversion unit 110 may store the position (coordinate value) of a specific character string (e.g., target character string) in the converted image.

The character string recognition unit 120 may receive the image from the image conversion unit 110 and recognize a character string in the image using a text recognition model. The text recognition model may include all various models (e.g., deep learning models) capable of recognizing a character string in an image, such as a scene text recognition model and a general optical character recognition model. For reference, the scene text recognition model may recognize text with high accuracy even if the text included in the image is deformed. The scene text recognition model may be composed of, for example, a Convolutional Neural Network (CNN)-based model that detects a character string region in an image and a Recurrent Neural Network (RNN)-based model that recognizes a character string in the detected character string region, but the scope of the present disclosure is not limited thereto. Those skilled in the art will already be familiar with the structure and operation principle of the scene text recognition model, so a detailed description of the scene text recognition model itself will be omitted.

In an embodiment, the text recognition model is trained using a text image set, and the text image set may include various text images generated through a data augmentation technique. In this case, even when the amount of the original text image set is small, a high-performance text recognition model may be constructed. Examples of data augmentation techniques may include color jittering, rotation, perspective transform, or blurring techniques, but the scope of the present disclosure is not limited thereto.

The obfuscation determination unit 130 may determine whether the target character string is an obfuscated character string based on the similarity between the character string recognized by the character string recognition unit 120 and the target character string. For example, when the similarity between the two character strings is equal to or less than a predetermined first reference value, the obfuscation determination unit 130 may determine that the target character string is obfuscated (e.g., determine that the target character string is Leet words). Alternatively, when the similarity between the two character strings exceeds the first reference value, the obfuscation determination unit 130 may determine that the target character string is not obfuscated. The similarity between two character strings may be measured based on various character string (text) similarity measurement algorithms such as Levenshtein distance algorithm, and any algorithm may be used.

The deciphering unit 140 may decipher the target character string based on the determination of the obfuscation determination unit 130 that the target character string is an obfuscated text. For example, the deciphering unit 140 may decipher the target character string using a database, in which obfuscated character strings and character strings corresponding thereto (i.e., deciphered character strings) are stored. Also, the deciphering unit 140 may determine whether the target character string is a new obfuscated character string based on the deciphering result. A detailed operation of the deciphering unit 140 will be described later.

The storage unit 150 may store the target character string determined as a new obfuscated character string by the deciphering unit 140 in a database. Here, the stored new obfuscated character string may be used for training of the text recognition model of the character string recognition unit 120.

According to an embodiment of the present disclosure, character strings (i.e., deciphered character strings) and a list of obfuscated character strings corresponding to the character strings are stored in the database, and information such as the ID of the character string and the ID of the obfuscated character string included in the obfuscated character string list, the first storage time and hit count may be stored. Here, the hit count may indicate the number of times the character string is derived as a candidate character string or a deciphering result. The candidate character string will be described in detail later.

According to one embodiment of the present disclosure, the database may be implemented in the form of cloud storage.

Meanwhile, according to an embodiment of the present disclosure, the obfuscated text processing apparatus 100 may further include a natural language processing unit (not shown). The natural language processing unit (not shown) may perform various natural language processing on the text, to which the deciphering result of the deciphering unit 140 is reflected. For example, suppose that the target character string included in the input text is determined to be Leet words, and the target character string is deciphered by the deciphering unit 140. In this case, the natural language processing unit (not shown) may convert the input text by replacing the target character string with deciphered text, and perform natural language processing (e.g., tokenization, embedding, entity name recognition, etc.) for the converted text through the trained natural language processing model. By doing so, the embedding accuracy may be improved, and the accuracy of the natural language processing result may also be improved.

The above-described obfuscated text deciphering apparatus 100 may be implemented as one or more computing devices having a processor. For example, each component such as the image conversion unit 110 may be implemented as one computing device, or a plurality of components or the obfuscated text deciphering apparatus 100 may be implemented as one computing device. A computing device may refer to any device having a computing function, and an example of such a device may be referred to FIG. 13.

Next, a method for deciphering obfuscated text according to another embodiment of the present disclosure will be described with reference to FIG. 2 and the following drawings. The method of deciphering obfuscated text according to this embodiment may be performed by one or more computing devices. For example, in the obfuscated text deciphering method according to the present embodiment, all operations may be performed by one computing device, or some operations may be performed by another computing device. Hereinafter, it will be described on the assumption that the method described below is performed by the obfuscated text deciphering apparatus 100 illustrated in FIG. 1. Accordingly, in the following description, when description of a subject of performing some operations is omitted, it would be understood that they are performed by the obfuscated text deciphering apparatus 100.

Figure 2:
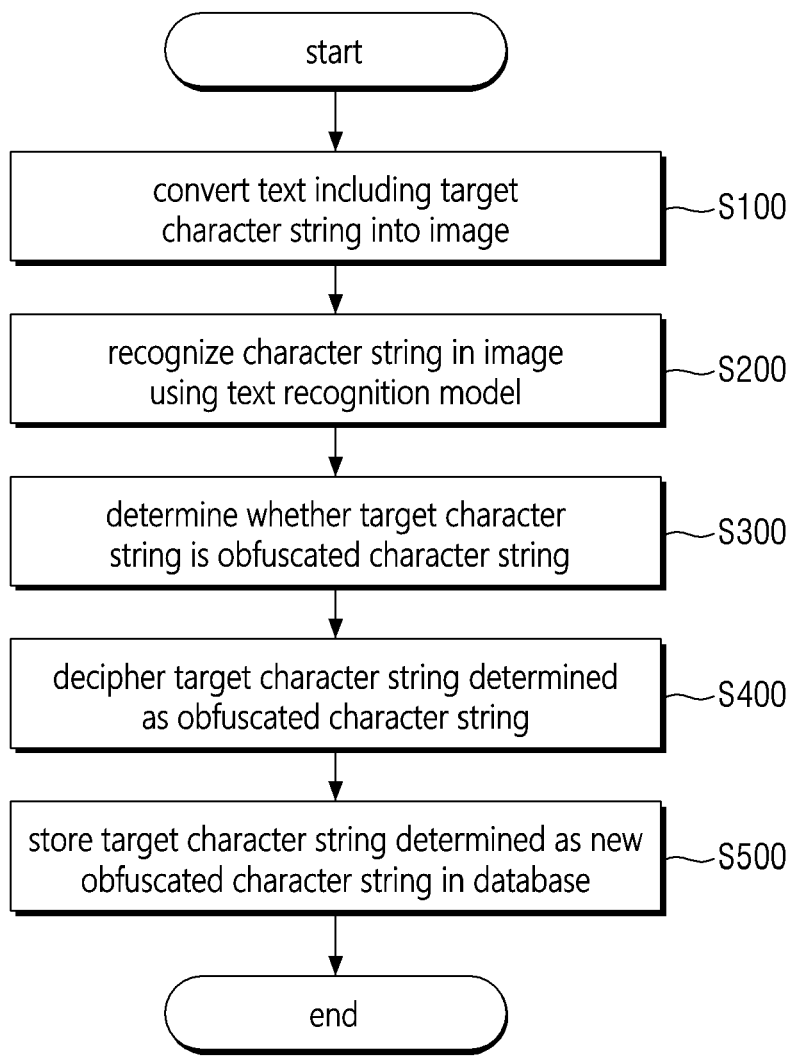
FIG. 2 is a flowchart of a method for deciphering obfuscated text according to another embodiment of the present disclosure.

FIG. 2 is a flowchart of a method for deciphering obfuscated text according to another embodiment of the present disclosure.

In step S100, the text including the target character string is converted into an image by the image conversion unit 110.

In step S200, a character string is recognized in the converted image using the text recognition model of the character string recognition unit 120. The text recognition model may be, for example, the previously described scene text recognition model. However, the scope of the present disclosure is not limited thereto.

In step S300, it is determined whether the target character string is an obfuscated character string.

Figure 3:
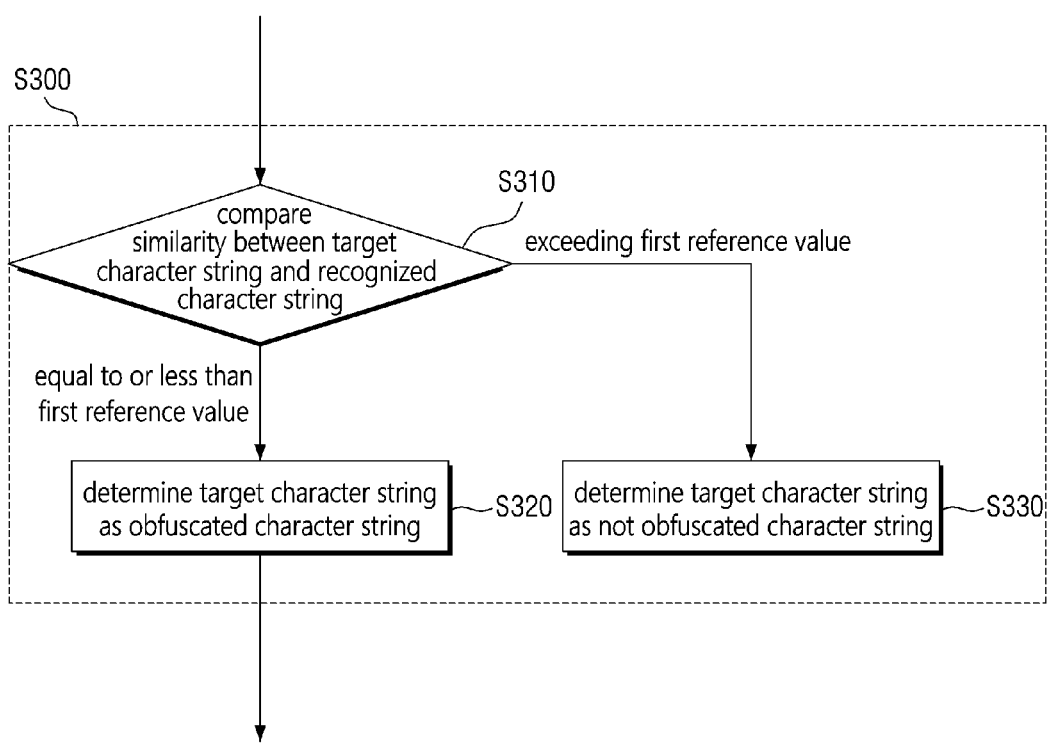
FIG. 3 is a detailed flowchart for describing in detail the operation of the method for determining whether a target character string is an obfuscated character string described with reference to FIG. 2.

FIG. 3 is a flowchart illustrating an embodiment, in which step S300 of FIG. 2 is further specified. Referring to FIG. 3, the similarity between the target character string and the recognized character string is compared (S310), and when it is equal to or less than a first reference value, it may be determined that the target character string is an obfuscated character string (S320). If the similarity exceeds the first reference value, it may be determined that the target character string is not an obfuscated character string (S330). Here, the similarity between the two strings may be calculated based on, for example, Levenshtein distance algorithm, but the scope of the present disclosure is not limited thereto.

Referring back to FIG. 2, in step S400, the target character string is decrypted based on the determination that the target character string is an obfuscated string (S400).

Figure 4:
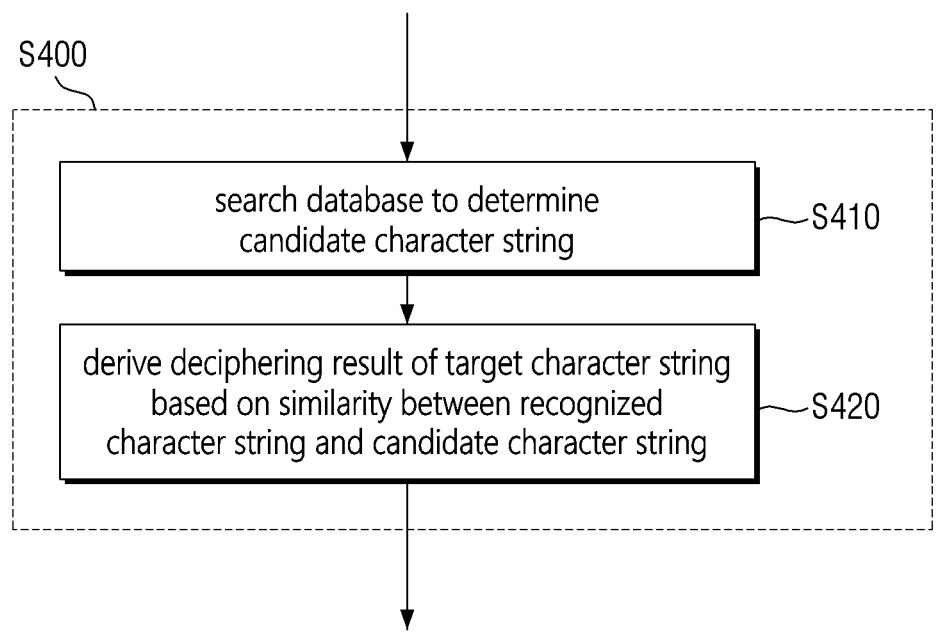
FIG. 4 is a detailed flowchart for describing in detail the operation of the method of deciphering a target character string determined as an obfuscated character string described with reference to FIG. 2.

FIG. 4 is a flowchart illustrating an embodiment, in which step S400 of FIG. 2 is further specified. Referring to FIG. 4, first, a database is searched using a recognized character string to determine one or more candidate character strings (S410), and a deciphering result of a target character string may be derived based on the similarity between the recognized character string and the candidate character string (S420).

Various embodiments of a method for determining a candidate character string in step S410 of FIG. 4 will be described with reference to FIGS. 5 to 7.

Figure 5:
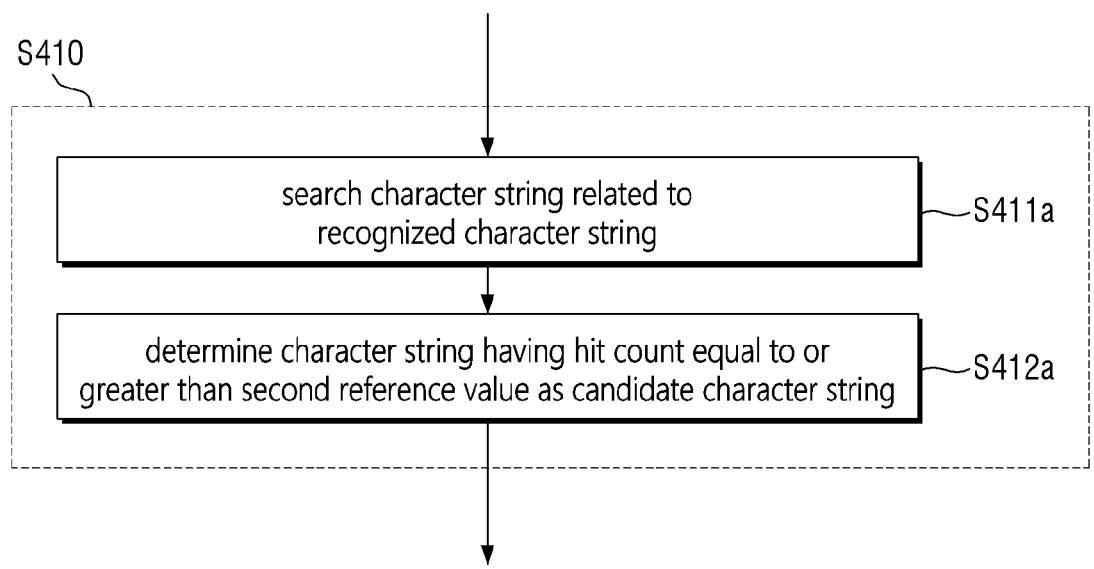
FIGS. 5 to 7 are detailed flowcharts for describing embodiments of a method for determining a candidate character string described with reference to FIG. 4.

FIG. 5 is a flowchart illustrating a method for determining a candidate character string according to an embodiment of the present disclosure. Referring to FIG. 5, first, a character string related to a recognized character string may be searched in a database (S411*a*), and a character string having a hit count equal to or greater than a second reference value may be determined as a candidate character string (S412*a*). For example, a database may be searched using a part of a recognized character string (i.e., a partial character string), and a character string having a hit count of 10 or more among the searched character strings may be determined as a candidate character string.

Figure 6:
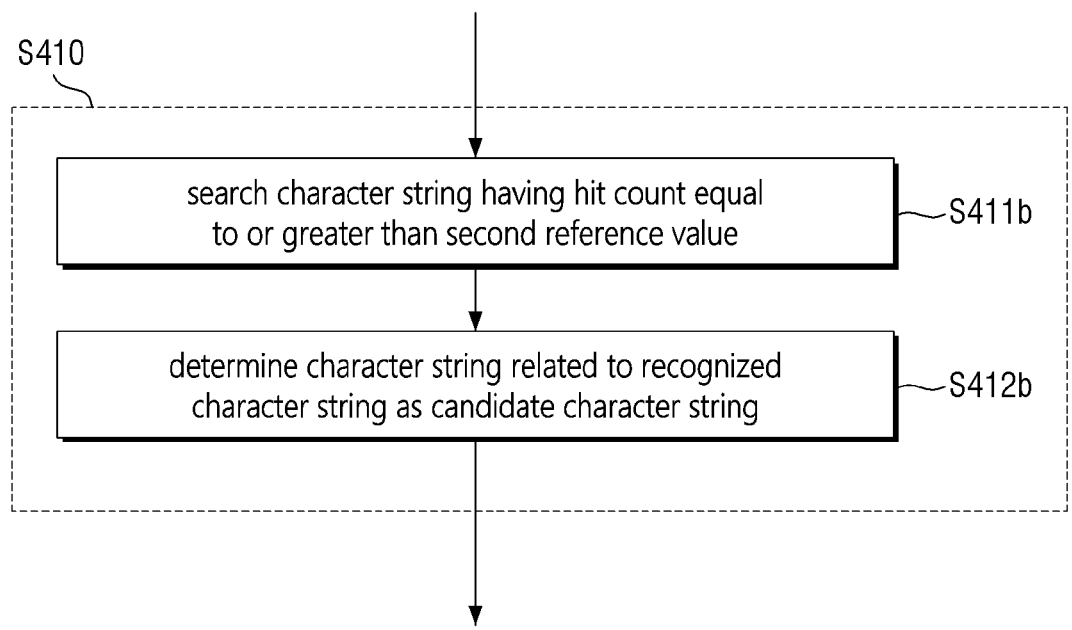

FIG. 6 is a flowchart illustrating a method for determining a candidate character string according to another embodiment of the present disclosure. Referring to FIG. 6, a character string having a hit count equal to or greater than the second reference value is searched for in the database (S411*b*), and a character string related to the recognized character string among the searched character strings may be determined as a candidate character string (S412*b*). For example, a candidate character string may be determined by re-searching using a part of the recognized character string (i.e., a partial character string) for the character string searched based on the hit count.

Figure 7:
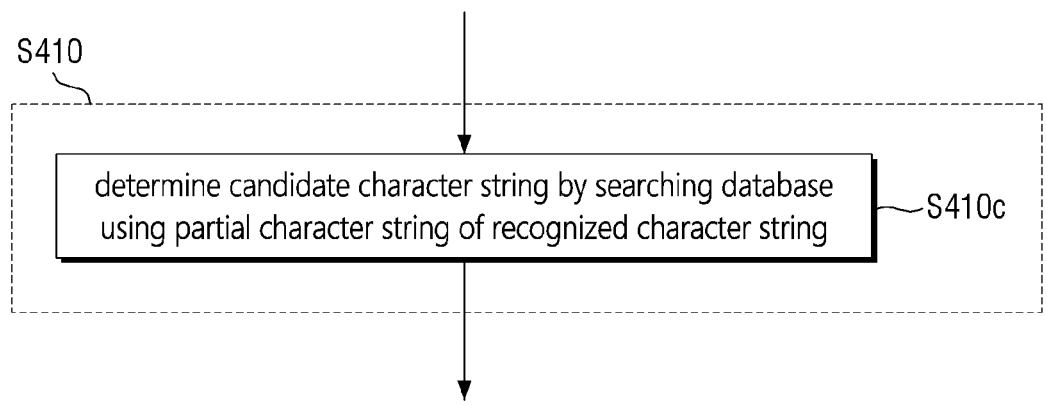

FIG. 7 is a flowchart illustrating a method for determining a candidate character string according to another embodiment of the present disclosure. Referring to FIG. 7, a candidate character string may be determined by searching a database using a partial character string of a recognized character string (S410*c*).

For example, when a recognized character string is TE-MM-P-, a database may be searched for using partial character strings such as TE, MM, TEM, MP, etc. to determine candidate character strings.

According to the above-described embodiments, instead of calculating similarity with all character strings stored in the database, candidate character strings are determined through a database search and similarity with recognized character strings is calculated for only the candidate character strings, thereby the effect of reducing computing costs may be achieved. In other words, through the above-described embodiments, the computing cost required in the deciphering process of the obfuscated character string may be greatly reduced.

Figure 8:
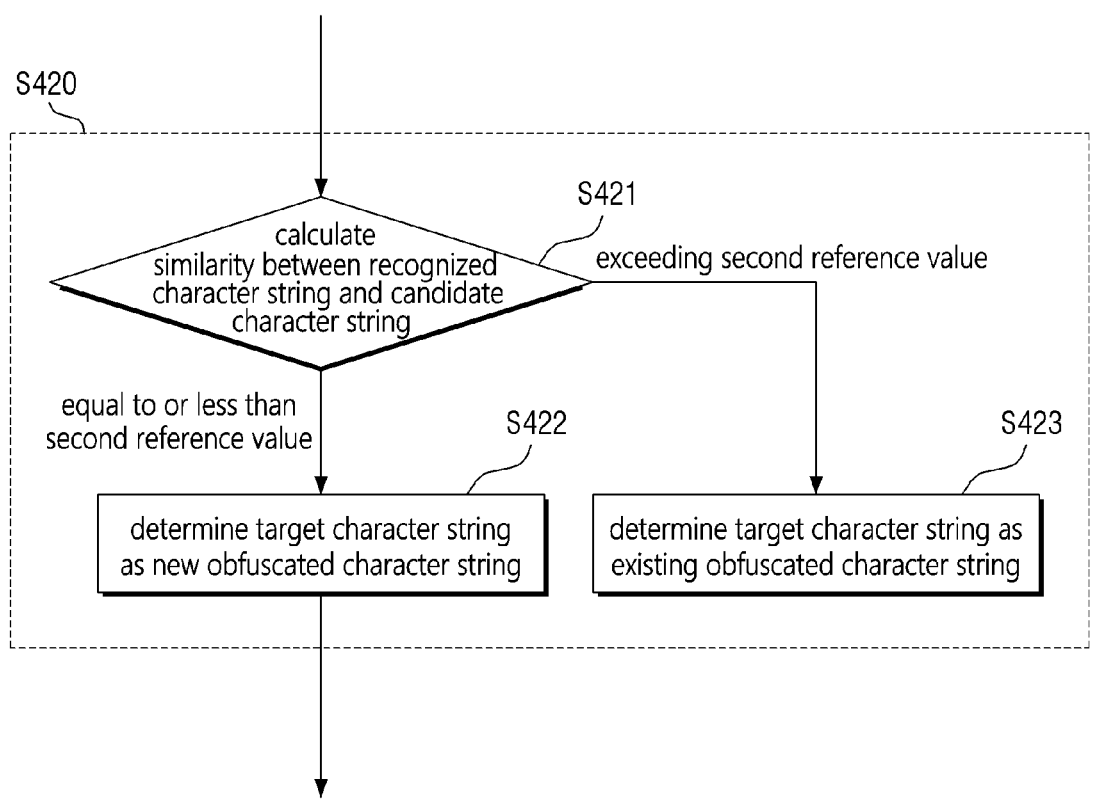
FIG. 8 is a detailed flowchart for describing a method of deriving a deciphering result of a target character string described with reference to FIG. 4.

FIG. 8 is a flowchart illustrating an embodiment, in which step S420 of FIG. 4 is further specified. Referring to FIG. 8, the similarity between the recognized character string and one or more candidate character strings is compared (S421), and if it is equal to or less than the second reference value, it may be determined that the target character string is a new obfuscated character string (S422). For example, when the highest similarity between one or more candidate character strings and the recognized character string is equal to or less than the second reference value, the target character string may be determined to be a new obfuscated character string. In the opposite case, a candidate character string exceeding the second reference value (e.g., a candidate character string having the highest similarity) may be determined as a deciphering result for the target character string. That is, it may be determined that the target character string is an existing obfuscated character string (S423).

Figure 9:
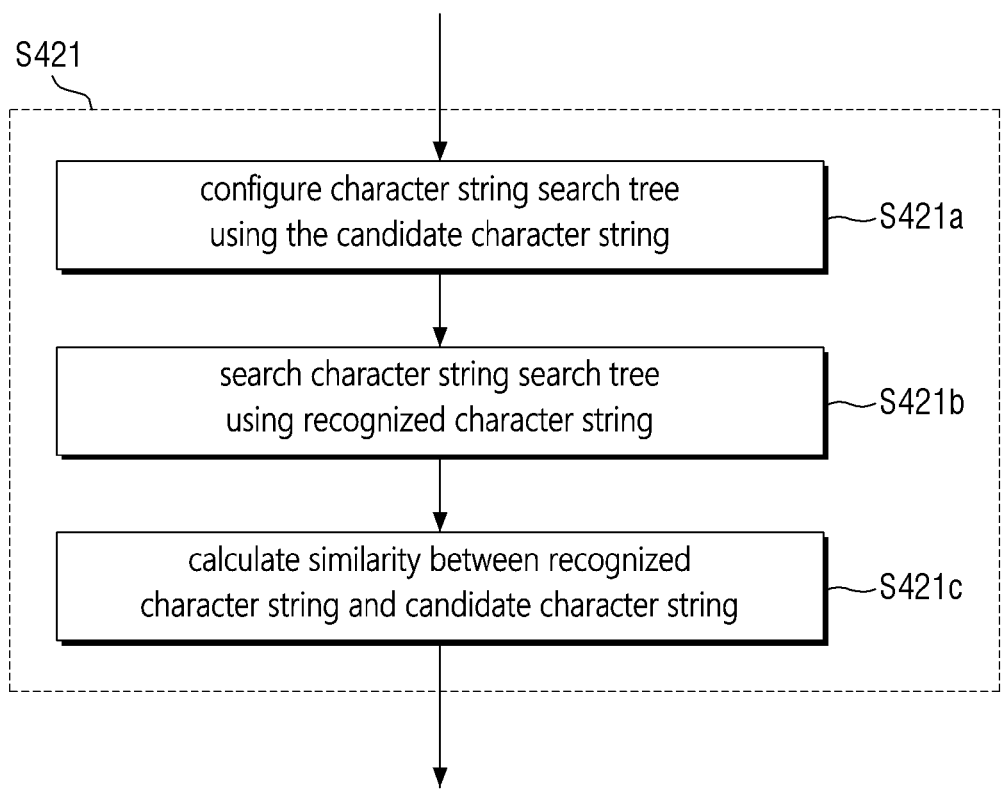
FIG. 9 is a detailed flowchart for describing in detail the operation of the similarity comparison method between a target character string and a recognized character string described with reference to FIG. 8.

FIG. 9 is a flowchart illustrating an embodiment in which step S421 of FIG. 8 is further specified. Referring to FIG. 9, first, a character string search tree may be configured using the one or more candidate character strings (S421$a$). Further, the character string search tree may be searched using the recognized character string (S421$b$), and a similarity between the recognized character string and the one or more candidate character strings may be calculated (S421$c$).

Figure 10:
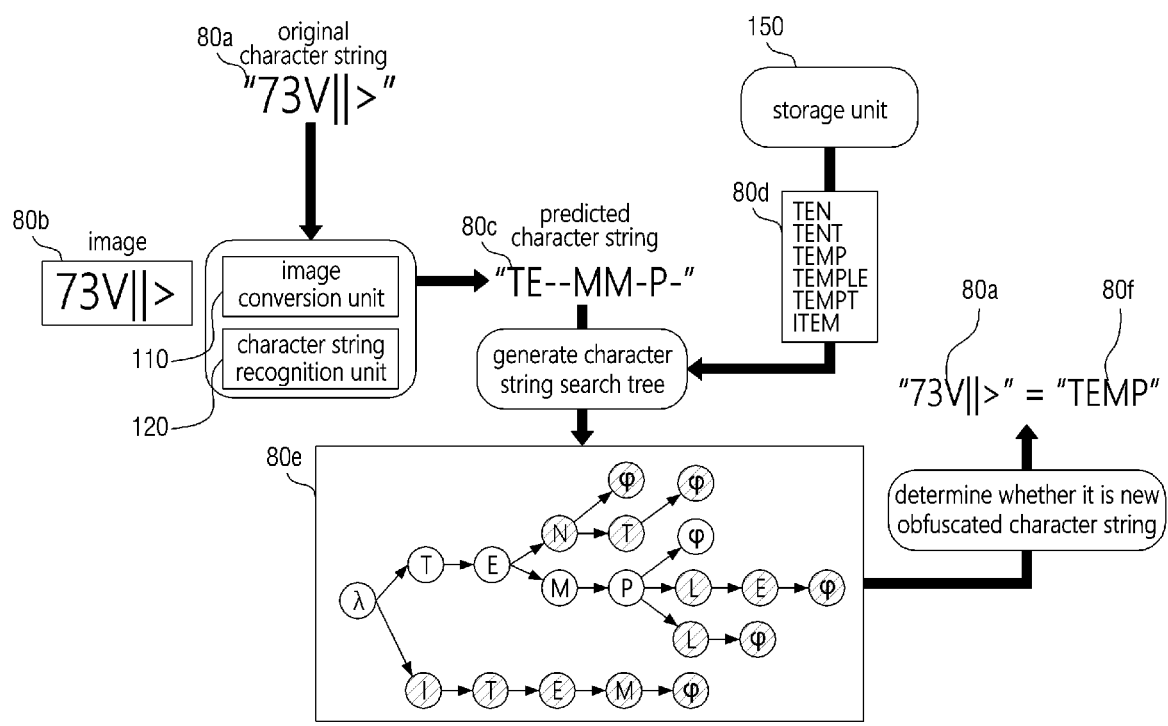
FIG. 10 is a diagram for describing an exemplary method of determining whether there is a new obfuscated character string using a tree in some embodiments of the present disclosure.

FIG. 10 is a diagram for describing a method of calculating a character string similarity using a character string search tree according to an embodiment of the present disclosure of FIG. 9.

Referring to FIG. 10, first, text including a target character string 80$a$ is converted into an image 80$b$ by the image conversion unit 110. Then, the character string 80$c$ is recognized in the image 80$b$ by the character string recognition unit 120.

Next, one or more candidate character strings are determined by searching the database to configure a character string search tree. For details on this, the description of FIGS. 5 to 7 may be referred. FIG. 10 shows that six candidate character strings are searched for as an example.

Next, a character string search tree 80$e$ is configured using the candidate character string 80$d$. Here, the character string search tree may mean, for example, a tree, in which each node (or edge) corresponds to one or more characters and a path from a root node to a leaf node corresponds to one character string.

Next, by searching the character string search tree 80$e$, the similarity between the recognized character string 80$c$ and the candidate character string 80$d$ is calculated. For example, a search may be performed along a path, in which each character constituting the recognized character string 80$c$ and a character corresponding to each node match, and a candidate character string (e.g., TEMP) corresponding to the search path (or a candidate character string corresponding to the longest search path) may be determined to have the highest similarity. In other words, the similarity between the recognized character string 80$c$ and the candidate character string 80$d$ may be calculated based on the length of the search path.

Next, when the highest similarity calculated through the character string search tree 80$e$ exceeds the second reference value, the recognized character string 80$c$ is determined as an existing obfuscated character string, and a candidate character string 80$f$ having the highest similarity may be derived as a deciphering result of the target character string 80$a$. As described above, if the highest similarity is equal to or less than the second reference value, the target character string 80$a$ is determined as a new obfuscated text.

FIG. 10 illustrates a case, in which the candidate character string 80$f$ is derived as a deciphering result of the target text 80$a$, as an example.

Referring back to FIG. 2, in step S500, data related to a target character string determined as a new obfuscated character string is stored in a database.

According to an embodiment of the present disclosure, an original character string corresponding to the new obfuscated character string may be stored in a database. In addition, the original character string itself, category, corresponding encoded text list, hit count, explanatory text for the character string, or reference data related to the character string may be stored.

According to an embodiment of the present disclosure, the target character string determined as the new obfuscated character string may be stored in a database. In addition, the ID assigned to the target character string, the original character string, an image file including the obfuscated character string, location information, the number of references as a candidate character string, or the time saved in the database may be stored in the database.

FIGS. 11 and 12 are diagrams for describing exemplary methods of character strings stored in a database of the present disclosure.

According to one embodiment of the present disclosure, FIG. 11 shows an example 90$a$, in which data related to an original character string is stored in a database when the original character string is "LEET." FIG. 11 is an example of a case where the original character string is referenced 94 times as a candidate character string (91$a$).

According to an embodiment of the present disclosure, FIG. 12 shows examples 90$b$ and 90$c$, in which obfuscated character strings corresponding to original character strings are stored in a database. FIG. 12 is an example of a case where the obfuscated character string "l337" is referenced 3 times (91$b$) and the obfuscated string "l337" is referenced 91 times (91$c$).

Figure 13:
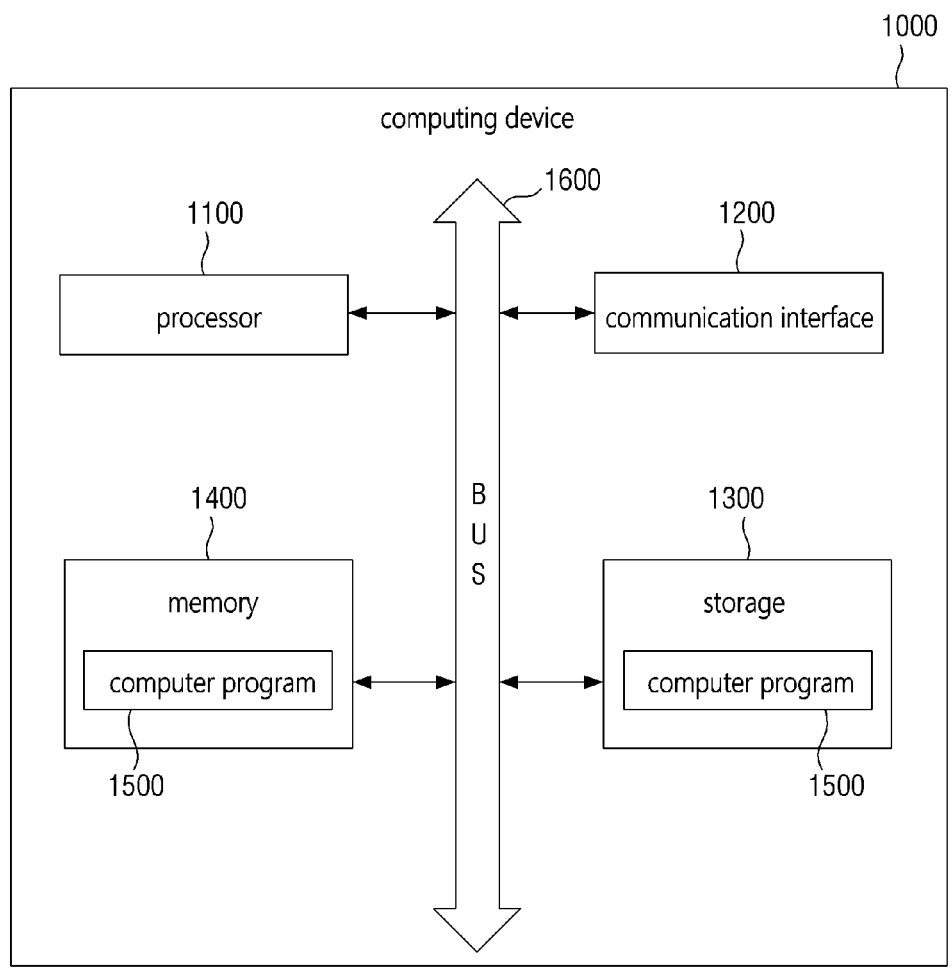
FIG. 13 is a block diagram illustrating an exemplary hardware configuration of a computing device, in which various embodiments of the present disclosure may be implemented.

FIG. 13 is a hardware configuration diagram of an exemplary computing device capable of implementing the obfuscated text deciphering apparatus 100 according to some embodiments of the present disclosure. As shown in FIG. 13, the computing device 1000 may comprise one or more processors 1100, a system bus 1600, a communication interface 1200, a memory 1400 for loading a computer program 1500 executed by the processor 1100 and a storage 1300 for storing the computer program 1500.

The processor 1100 controls the overall operation of each component of the computing device 1000. The processor 1100 may perform an operation for at least one application or program for executing a method/operation according to various embodiments of the present disclosure.

The memory 1400 stores various data, commands and/or information. The memory 1400 may load one or more computer programs 1500 from storage 1300 to execute methods/operations according to various embodiments of the present disclosure.

The storage 1300 may non-temporarily store one or more computer programs 1500.

The computer program 1500 may include one or more instructions, in which methods/operations according to various embodiments of the present disclosure may be implemented. When the computer program 1500 is loaded into the memory 1400, the processor 1100 may execute the one or more instructions to perform methods/operations according to various embodiments of the present disclosure.

The computer program 1500 may comprise instructions for performing operations comprising, for example, an operation of converting text including a target character string into an image, an operation of recognizing a character string in an image using a text recognition model, and an operation of determining a target character string as an obfuscated character string when the similarity between the target character string and the recognized character string is equal to or less than a first reference value. In this case, the obfuscated text deciphering apparatus 100 according to an embodiment of the present disclosure may be implemented through the computing device 1000.

So far, various embodiments of the present disclosure and effects according to the embodiments have been described with reference to FIGS. 1 to 13. Effects according to the technical spirit of the present disclosure are not limited to the effects mentioned above, and other effects not mentioned will be clearly understood by those skilled in the art from the description below.

The technical idea of the present disclosure described so far may be implemented as computer readable code on a computer readable medium. The computer program recorded on the computer-readable recording medium may be transmitted to another computing device through a network such as the Internet, installed in the other computing device, and thus used in the other computing device.

Although operations are shown in a particular order in the drawings, it should not be understood that the operations should be performed in the specific order shown or in a sequential order, or that all shown operations should be performed to obtain a desired result. In certain circumstances, multitasking and parallel processing may be advantageous. Although the embodiments of the present disclosure have been described with reference to the accompanying drawings, those of ordinary skill in the art to which the present disclosure pertains would understand that the present disclosure may be practiced in other specific forms without changing the technical spirit or essential features. Therefore, it should be understood that the embodiments described above are illustrative in all respects and not limiting. The protection scope of the present disclosure should be construed by the claims below, and all technical ideas within the equivalent range should be construed as being included in the scope of the technical ideas defined by the present disclosure.

What is claimed is:

1. A method for deciphering obfuscated text, the method being performed by at least one processor and comprising:
   obtaining text including a target character string from an electronic document;
   converting the text into an image;
   inputting the image into a text recognition model to obtain a character string from the image;
   calculating a similarity value based on a comparison of the target character string and the recognized character string;
   based on the similarity value being equal to or less than a first reference value:
      determining that the target character string is an obfuscated character string;
      deciphering the target character string; and
      replacing the target character string with the deciphered target character string in the text; and
   inputting the text into a trained natural language processing model to obtain a natural language processing result,
   wherein the text recognition model is trained using a text image set, and
   wherein the text image set includes a text image generated through at least one of color jittering, rotation, perspective transform, or blurring.

2. The method of claim 1, wherein the deciphering the target character string comprises:
   obtaining one or more candidate character strings by searching a database using the recognized character string, wherein character strings and a list of obfuscated character strings corresponding to the character strings are stored in the database; and
   obtaining a result of the deciphering the target character string based on a similarity between the recognized character string and the one or more candidate character strings.

3. The method of claim 2, wherein the obtaining the result of the deciphering comprises:
   determining that the target character string is a new obfuscated character string based on a similarity between the recognized character string and the one or more candidate character strings being equal to or less than a second reference value.

4. The method of claim 2, wherein the obtaining the result of the deciphering comprises:
   determining, among the one or more candidate character strings, a candidate character string whose similarity with the recognized character string exceeds a second reference value as the result of the deciphering the target character string.

5. The method of claim 2, wherein the obtaining the result of the deciphering comprises:
   configuring a character string search tree using the one or more candidate character strings; and
   calculating a similarity between the recognized character string and the one or more candidate character strings, by searching the character string search tree using the recognized character string.

6. The method of claim 2, wherein a hit count indicating a number of times the character string is obtained as a candidate character string of a specific obfuscated character string or indicating a number of times the character string is obtained as the result of the deciphering is further stored in the database, and
   wherein the obtained one or more candidate character strings comprise a character string having a hit count equal to or greater than a second reference value.

7. The method of claim 2, wherein an ID of the character string, an ID and a first storage time of an obfuscated character string included in the list of obfuscated character strings, and a hit count indicating a number of times the character string is obtained as a candidate character string of a specific obfuscated character string or indicating a number of times the character string is obtained as the result of the deciphering are further stored in the database.

8. The method of claim 3, further comprising:
   storing the target character string in the database based on a determination that the target character string is the new obfuscated character string.

9. The method of claim 1, wherein the text recognition model is a Scene Text Recognition (STR) model.

10. The method of claim 1, wherein the obfuscated character string is a character string comprising Leet words.

11. An apparatus for deciphering obfuscated text, the apparatus comprising:
at least one processor; and
at least one memory configured to store a computer program executable by the at least one processor,
wherein the computer program is executable by the at least one processor to cause the at least one processor to perform:
obtaining text including a target character string from an electronic document;
converting the text into an image;
inputting the image into a text recognition model to obtain a character string from the image;
calculating a similarity value based on a comparison of the target character string and the recognized character string; and
based on the similarity value being equal to or less than a first reference value:
determining that the target character string is an obfuscated character string;
deciphering the target character string; and
replacing the target character string with the deciphered target character string in the text; and
inputting the text into a trained natural language processing model to obtain a natural language processing result,
wherein the text recognition model is trained using a text image set, and
wherein the text image set includes a text image generated through at least one of color jittering, rotation, perspective transform, or blurring.

12. The apparatus of claim 11, wherein the computer program further causes the at least one processor to perform:
deciphering the target character string through a database or determining whether the target character string is new obfuscated text based on a determination that the target character string is the obfuscated character string, wherein character strings and a list of obfuscated character strings corresponding to the character strings are stored in the database; and
storing the target character string in the database based on the determination that the target character string is a new obfuscated character string.

13. The apparatus of claim 12, wherein an ID of the character string and an ID of an obfuscated character string included in the list of obfuscated character strings are further stored in the database.

14. A non-transitory computer-readable recording medium storing a computer program, the computer program being executable by at least one processor to cause the at least one processor to perform:
obtaining text including a target character string from an electronic document;
converting the text into an image;
inputting the image into a text recognition model to obtain a character string from the image;
calculating a similarity value based on a comparison of the target character string and the recognized character string;
based on the similarity value being equal to or less than a first reference value:
determining that the target character string is an obfuscated character string;
deciphering the target character string; and
replacing the target character string with the deciphered target character string in the text; and
inputting the text into a trained natural language processing model to obtain a natural language processing result,
wherein the text recognition model is trained using a text image set, and
wherein the text image set includes a text image generated through at least one of color jittering, rotation, perspective transform, or blurring.

15. The computer program of claim 14, wherein the deciphering the target character string comprises:
obtaining one or more candidate character strings by searching a database using the recognized character string, wherein character strings and a list of obfuscated character strings corresponding to the character strings are stored in the database; and
obtaining a result of the deciphering the target character string based on a similarity between the recognized character string and the one or more candidate character strings.

16. The computer program of claim 15, wherein an ID of the character string, an ID and a first storage time of an obfuscated character string included in the list of obfuscated character strings, and a hit count indicating a number of times the character string is obtained as a candidate character string of a specific obfuscated character string or indicating a number of times the character string is obtained as the result of the deciphering are further stored in the database.

* * * * *